(12) United States Patent
Kokuga

(10) Patent No.: US 12,433,273 B2
(45) Date of Patent: Oct. 7, 2025

(54) LURE WITH TWO SWING RANGES

(71) Applicant: Shimano Inc., Osaka (JP)

(72) Inventor: Kimio Kokuga, Osaka (JP)

(73) Assignee: Shimano Inc., Osaka (JP)

( * ) Notice: Subject to any disclaimer, the term of this patent is extended or adjusted under 35 U.S.C. 154(b) by 210 days.

(21) Appl. No.: 17/688,375

(22) Filed: Mar. 7, 2022

(65) Prior Publication Data

US 2022/0361466 A1    Nov. 17, 2022

(30) Foreign Application Priority Data

May 12, 2021  (JP) ................. 2021-081146
Nov. 22, 2021  (JP) ................. 2021-189625

(51) Int. Cl.
*A01K 85/18* (2006.01)

(52) U.S. Cl.
CPC .................... *A01K 85/18* (2013.01)

(58) Field of Classification Search
CPC ............. A01K 85/18; A01K 85/1881; A01K 85/1883; A01K 85/16; A01K 85/1807; A01K 85/1841; A01K 85/1863
USPC ........... 43/42.15, 42.24, 42.28, 42.02, 42.03, 43/42.22
See application file for complete search history.

(56) References Cited

U.S. PATENT DOCUMENTS

| | | | | |
|---|---|---|---|---|
| 1,477,756 A * | 12/1923 | Heddon | ............... | A01K 85/18 43/42.34 |
| 1,692,935 A * | 11/1928 | Heddon | ............... | A01K 85/18 43/42.15 |
| 1,786,568 A * | 12/1930 | Kutz | ............... | A01K 85/18 43/42.34 |
| 1,791,316 A * | 2/1931 | Jordan | ............... | A01K 85/18 43/42.15 |
| 2,416,834 A * | 3/1947 | Kuslich | ............... | A01K 85/18 43/42.34 |
| 2,503,529 A * | 4/1950 | Wardrip | ............... | A01K 85/18 43/42.15 |
| 2,556,533 A * | 6/1951 | Graaten | ............... | A01K 85/18 43/42.22 |
| 2,597,792 A * | 5/1952 | Hardy | ............... | A01K 85/18 43/42.26 |

(Continued)

FOREIGN PATENT DOCUMENTS

| | | |
|---|---|---|
| JP | 3132520 U | 5/2007 |
| JP | 2019-97526 A | 6/2019 |
| JP | 2019-103429 A | 6/2019 |

*Primary Examiner* — Zoe Tam Tran
(74) *Attorney, Agent, or Firm* — Global IP Counselors, LLP

(57) ABSTRACT

A lure includes a first body, a second body and a connecting portion. The first body includes a head on a head side and a tail side. The second body includes a tail and is connected to the tail side of the first body. The connecting portion connects the second body to the first body such that the second body is swingable relative to the first body over a swing range that extends to both left and right sides of the lure toward the head side of the first body. The swing range is capable of exceeding 90 degrees on each of the left and right sides, where 0 degrees is defined as when the position of the second body with respect to the first body is such that a line connecting the head and the tail is located on a straight line, as seen in a top view.

20 Claims, 15 Drawing Sheets

(56) References Cited

U.S. PATENT DOCUMENTS

| | | | | |
|---|---|---|---|---|
| 2,685,145 | A * | 8/1954 | Dean | A01K 85/18 43/42.15 |
| 3,172,227 | A * | 3/1965 | Mackey | A01K 85/18 43/42.31 |
| 3,367,059 | A * | 2/1968 | Puls | A01K 85/18 43/42.31 |
| 5,406,738 | A * | 4/1995 | Holleman, Sr. | A01K 85/18 43/42.15 |
| 2002/0083636 | A1* | 7/2002 | Thorne | A01K 85/18 43/42.03 |
| 2002/0170225 | A1* | 11/2002 | Gibbs | A01K 85/00 43/42.28 |
| 2002/0189150 | A1* | 12/2002 | Thorne | A01K 85/18 43/42.15 |
| 2005/0102884 | A1* | 5/2005 | Kato | A01K 85/18 43/42.15 |
| 2011/0239521 | A1* | 10/2011 | Tsai | A01K 85/18 43/42.47 |
| 2013/0185989 | A1* | 7/2013 | Langer | A01K 85/12 43/42.11 |
| 2016/0360737 | A1* | 12/2016 | Yates | A01K 85/18 |
| 2019/0246612 | A1* | 8/2019 | Shunk | A01K 85/18 |

* cited by examiner

LURE WITH TWO SWING RANGES

CROSS-REFERENCE TO RELATED APPLICATIONS

This application claims priority to Japanese Patent Application No. 2021-081146, filed on May 12, 2021 and Japanese Patent Application No. 2021-189625, filed on Nov. 22, 2021. The entire disclosure of Japanese Patent Application Nos. 2021-081146 and 2021-189625 is hereby incorporated herein by reference.

BACKGROUND

Field of the Invention

The present disclosure relates to a lure.

Background Art

Japanese published unexamined application 2019-97526 Official Notice discloses a fishing lure of the prior art wherein the movement of a joint is restricted by a tapered resistance in order to simulate the natural movements of a swimming fish. Further, a lure made up of a plurality of interconnected bodies is configured to have a lighter rear body than the body located at the front of the lure, for example, by being made of a soft member, in order to distribute the weight of a lure when the lure is in flight (for example, refer to Japanese Laid-Open Patent Application No. 2019-103429).

SUMMARY

However, it has been determined that in Japanese published unexamined application 2019-97526 Official Notice, although it is possible to stabilize the swimming configuration of the lure once the lure lands in the water, the in-flight configuration of the lure is unstable. Thus, there is a demand for a lure with a stable configuration both during flight and after landing in the water.

Further, in Japanese Laid-Open Patent Application No. 2019-103429, since the center of gravity of the lure is located toward the front, the front side of the body attempts to fly ahead when the lure is in flight, and thus, it is possible to increase the flight distance and stabilize the configuration of the lure during flight. On the other hand, it has been determined that because the body on the rear side of the lure is made of a soft member and is lightweight, the swimming configuration when the lure lands in the water can become unstable; thus, there is room for improvement in this regard.

Embodiments of the present invention were conceived in light of these circumstances, and an object of this disclosure is to provide a lure that can stabilize its configuration during flight and after landing in the water, while ensuring a long flight distance.

A lure according to one embodiment of the present invention comprises a first body disposed on the head side, a second body connected to the tail side of the first body, and a connecting portion that connects the second body to the first body so as to be swingable over a swing range and that can be folded to both the left and right sides toward the head side of the first body, wherein the swing range is set to exceed 90 degrees on each of the left and right sides, where 0 degrees is defined as when the posture of the second body with respect to the first body is such that a line connecting the head and the tail is located on a straight line, as seen in a top view.

With the lure according to the present embodiment, because the swing range of the lure in the folded configuration, in which the second body is folded with respect to the first body, exceeds 90 degrees on both the left and right sides, at the time of flight, the lure adopts a folded configuration in which the tail side of the second body is folded toward the head side of the first body on either the left or the right side of the lure via the connecting portion, and, at the time of landing on the water, adopts a swimming configuration in which the head side of the second body faces the tail side of the first body. That is, the embodiment of the present invention enables stabilization of both the configuration at the time of flight and the configuration at the time of landing on the water.

Moreover, by embodiments of a lure according to the present invention, when the lure is in flight, the lure adopts a folded configuration in which the second body is folded with respect to the first body, and the center of gravity of the lure shifts to the front side, thereby making it possible to increase the flight distance. On the other hand, when the lure lands on the water, the second body returns to the rear-side position with respect to the first body, and the swing range becomes less than or equal to 90 degrees, and the lure can thus realize a stable swimming configuration.

The mass of the first body can be greater than the mass of the second body.

In this embodiment, because the first body on the head side is heavier than the second body on the tail side, when the lure is in flight, the second body precedes the first body in the direction of flight due to air resistance. Therefore, it is possible to achieve a folded configuration in which the tail side of the second body is more reliably folded toward the head side of the first body via the connecting portion.

The lure according to embodiments of the present invention comprises a first body disposed on the head side, a second body connected to the tail side of the first body, a connecting portion that connects the second body to the first body so as to be swingable over a first swing range that can be folded toward the head side of the first body, and a regulating member that maintains the swing range of the second body with respect to the first body to be in a second swing range that is narrower than the first swing range.

By embodiments of the lure according to the present invention, it is possible to switch, using the regulating member, the swing range of the connecting portion between a first swing range when the lure lands on the water, and a second swing range that is wider than the first swing range when the lure is in flight; thus, stabilization of both the configuration at the time of flight and the configuration at the time of landing on the water.

Further, by embodiments of the lure according to the present invention, when the lure is in flight, the swing range is the second swing range, the folded configuration is adopted in which the second body is folded with respect to the first body, and the center of gravity of the lure shifts to the front side, thereby making it possible to increase the flight distance. On the other hand, when the lure lands on the water, the second body returns to the rear-side position with respect to the first body, and thereby achieves a stable swimming configuration in the first swing range.

The connecting portion includes a magnetic body, and the regulating member includes a magnet that regulates the magnetic body so as to be held at the center of swing of the second swing range by the magnetic force acting on the magnetic body.

In this embodiment, a connecting member can be made to be attracted to the magnet by a magnetic force when the lure lands on the water. That is, the turning of the connecting member is regulated such that the connecting member does not swing significantly, so that the second body adopts the folded configuration in the second swing range and can make small swings in the first swing range in which the swimming configuration is adopted.

The connection portion is a member that is connected to the first body so as to be swingable, the first body has a swing support portion that supports the connecting member so as to be swingable in the second swing range, and the regulating member is disposed on the swing support portion and regulates the connecting member to be held at the center of swing of the second swing range.

The regulating member has a holding portion that is disposed on the swing support portion and holds the connecting member at the center of swing of the second swing range.

In this embodiment, if the connecting member is not subjected to a large swinging force, the connecting member is held by the holding portion located at the center of swing of the second swing range, thereby making it likely to swing over the first swing range in which the swimming configuration is adopted.

The holding portion is a recess that corresponds to the shape of the connecting member.

In this embodiment, the state in which the connecting member is fitted and engaged with the holding portion (recess) of the first body when the lure lands on the water is maintained. That is, the turning of the connecting member is regulated such that the connecting member does not swing significantly so that the second body adopts the folded configuration at a prescribed swing angle, and can make small swings in the range in which the swimming configuration is adopted.

The regulating member has a guiding portion that guides the connecting member to the holding portion.

In this embodiment, the connecting member is guided to the holding portion of the first body and maintained by the holding portion when the lure lands on the water. That is, the turning of the connecting member is regulated such that the connecting member does not swing significantly so that the second body adopts the folded configuration at a prescribed swing angle and can make small swings in the range in which the swimming configuration is adopted.

The guiding portion includes an inclined surface that is inclined toward the holding portion.

In this embodiment, the connecting member moves along the inclined surface toward the holding portion of the first body when the lure lands on the water. That is, the turning of the connecting member is maintained by the holding portion such that the connecting member does not swing significantly so that the second body adopts the folded configuration at a prescribed swing angle, and can make small swings in the range in which the swimming configuration is adopted.

A third body is connected to the tail side of the second body.

In this embodiment, even if the third body is provided, it is possible to achieve a stable configuration both at the time of flight and when the lure lands on the water, in the same manner as described above.

A hook for hooking a fish is disposed on the first body, and the first body and/or the second body includes a hook engagement portion that engages with the hook.

In this embodiment, since the hook disposed on the first body is engaged with the hook engagement portion so as to be fixed without moving, when the lure adopts the folded configuration at the time of flight, the hook of the first body is prevented from becoming entangled with the hook of the second body, for example.

As a result, the flight attitude can be stabilized, thereby achieving the desired flight distance. Further, the hook does not disengage from the hook engagement portion even when the lure lands on the water, and disengages from the hook engagement portion only when a fish bites. As a result, there is the advantage that even when the lure is made to swim and enters an unstable state as a result of being tossed by waves, etc., it is possible to prevent such problems as the barb of the hook becoming entangled with other structural parts.

By the lure according to embodiments of the present invention, it is possible to stabilize the configuration both during flight and after landing on the water, while ensuring a long flight distance.

DETAILED DESCRIPTION OF EMBODIMENTS

Embodiments of the lure according to the present invention are described below with reference to the figures. In each of the drawings, there are instances in which the scale of each component member has been appropriately changed as required to improve the visibility of the component member.

Embodiment 1

Figure 1:
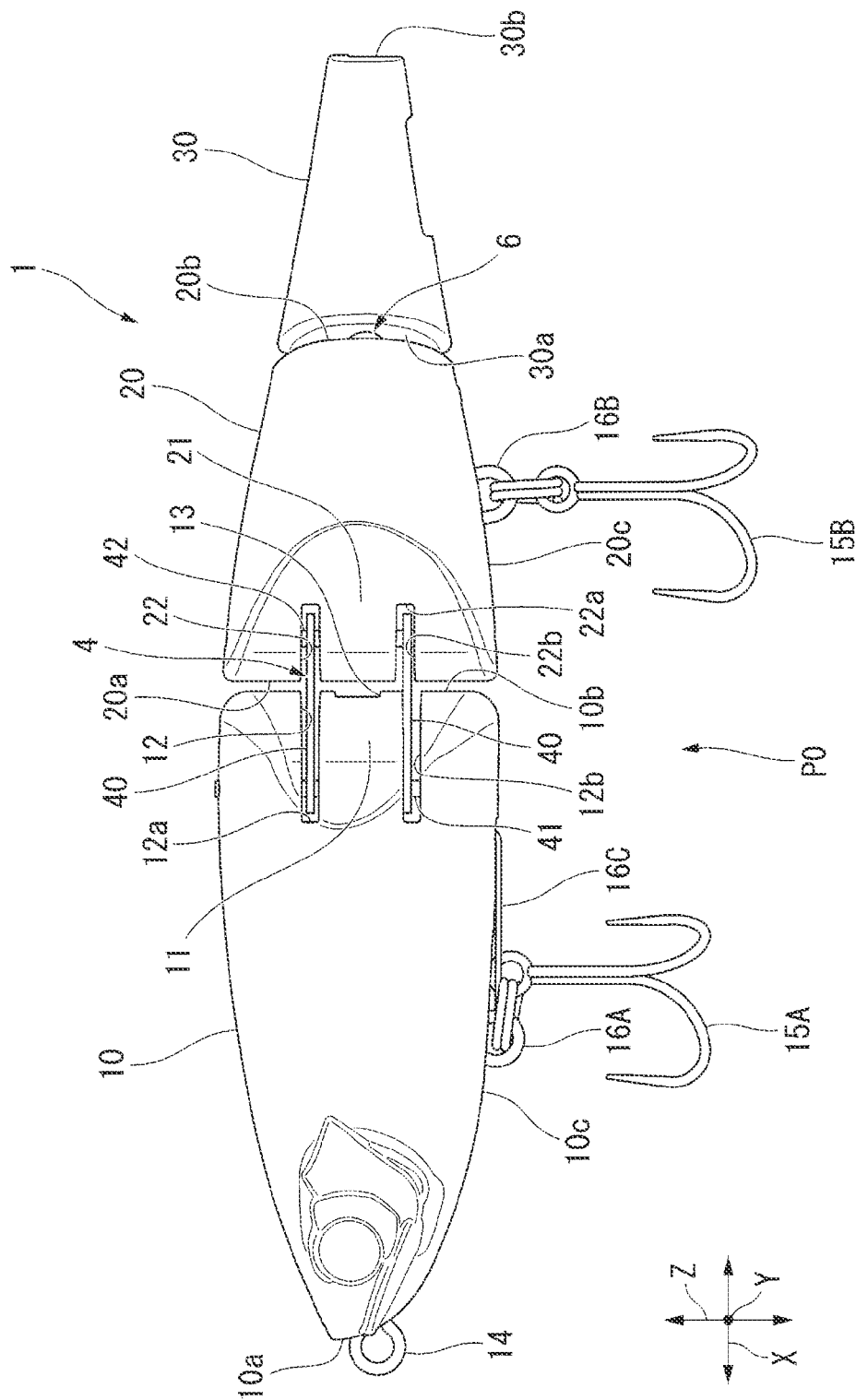
FIG. 1 is a full side view of a lure according to a first embodiment of the present invention.
Figure 2:
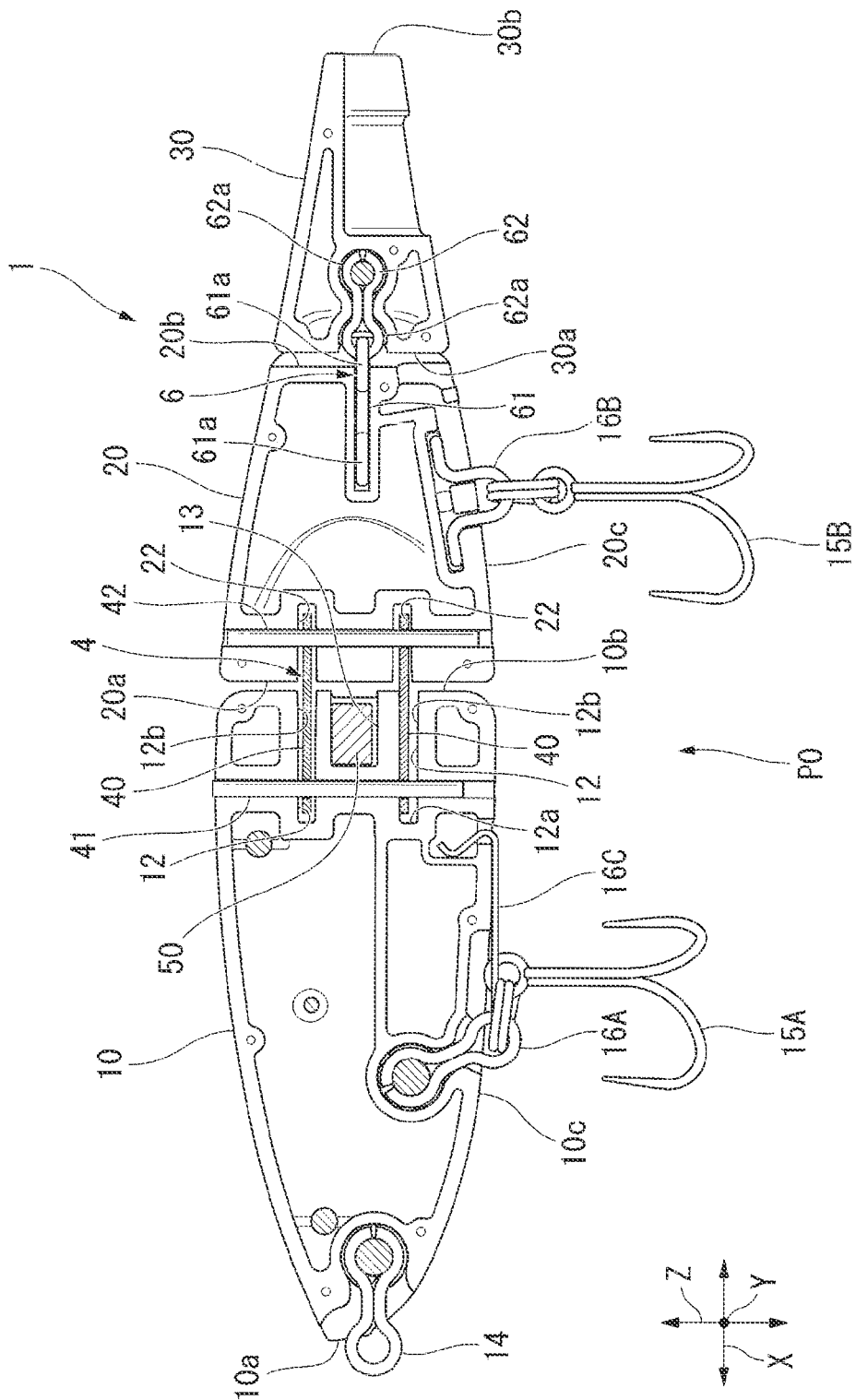
FIG. 2 is a longitudinal section of the lure of FIG. 1.

As shown in FIGS. 1 and 2, one example of a lure 1 according to the first embodiment is a joint-type fishing lure that has a body of hard plastic in the form of a small fish.

The lure 1 is configured to have a body in the form of a fish with an elastically deformable tail, not shown, made of soft plastic, for example.

Here, the direction in which the head and the tail of the lure 1 are connected in a straight line is defined as the front-rear direction X, the head side is defined as the front/front side using the symbol X1, and the tail side is defined as the rear/rear side using the symbol X2. Further, when viewed from above, the lateral direction orthogonal to the front-rear direction X is defined as the left-right direction Y, and the up-down direction of the lure 1 when in the swimming configuration is defined as the up-down direction Z in the following descriptions.

The lure 1 includes a first body 10, a second body 20, and a third body 30, in that order from front to rear.

The first body 10 is disposed on the head side and is formed in a shape approximately simulating the front half of a fish. A line eye 14 is provided on a front-end portion 10a of the first body 10. A first hook eye 16A, to which is connected a first hook 15A for hooking a fish, is provided on a lower portion 10c of the first body 10. The first body 10 is connected to the second body 20 via a connecting portion 4 so as to be swingable in the left-right direction Y. The connecting portion 4 includes a pair of upper and lower first connecting members 40, 40, which are formed in a plate shape. These first connecting members 40, 40 are respectively disposed on the first body 10 and the second body 20 so as to be freely swingable.

In the present embodiment, a pair of the upper and lower first connecting members 40 is disposed, but the number of the first connecting members 40 is not particularly limited. For example, there can be only one of the first connecting member 40, or three or more can be provided.

Figure 3:
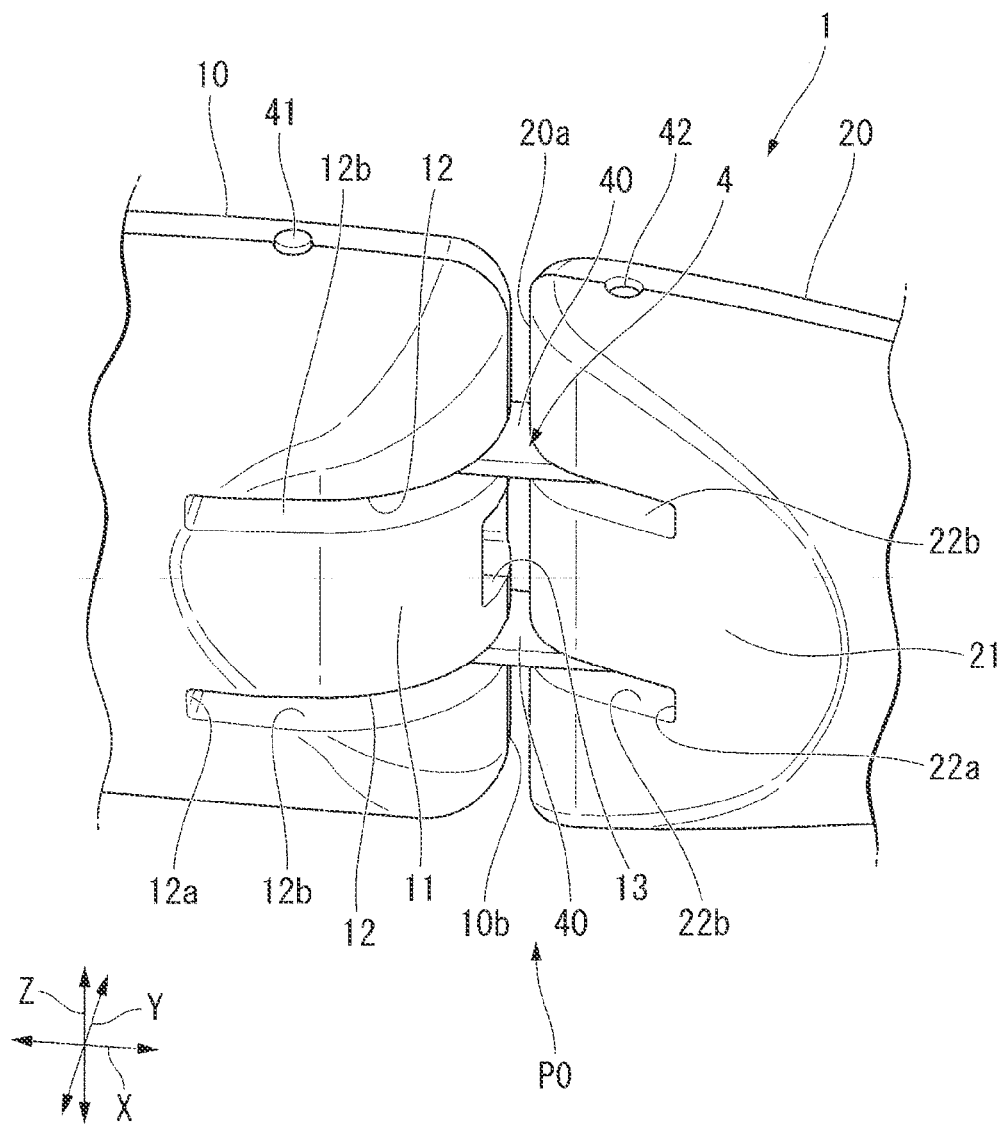
FIG. 3 is a perspective view of the connecting portion between a first body and a second body and shows a state of initial posture.
Figure 4:
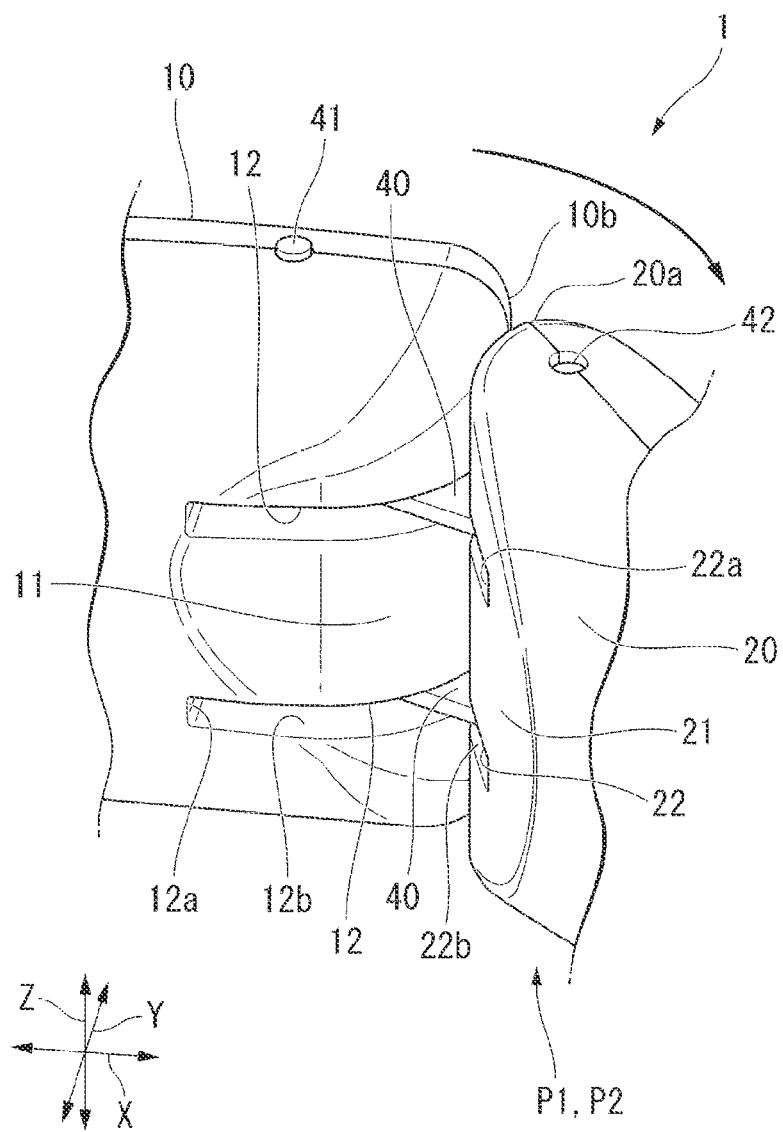
FIG. 4 is a perspective view of the connecting portion between the first body and the second body and shows a state of initial posture.
Figure 5:
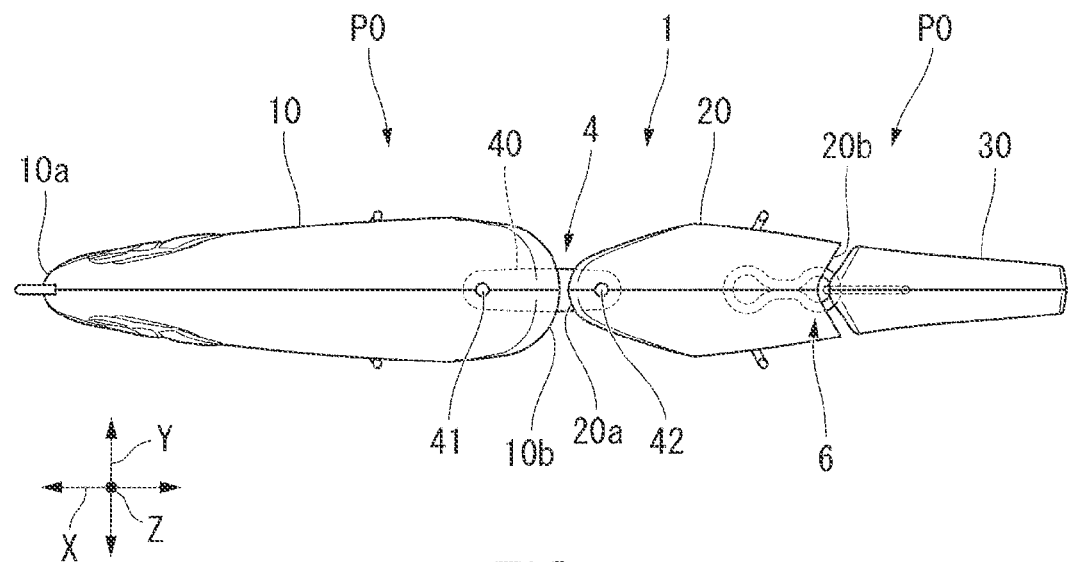
FIG. 5 is a plan view of the lure as seen from above and shows a state of initial posture.

The first connecting member 40 enables the second body 20 to be swingable over a swing range in which the tail side (rear-end portion 20b) of the second body 20 adopts a posture (folding posture P2) in which the tail side can be folded to both the left and right sides toward the head side (front-end portion 10a) of the first body 10 (refer to FIGS. 3 and 4). The swing range of the lure 1 can exceed 90 degrees on each of the left and right sides, where 0 degrees is defined as when the position (initial position P0) of the second body 20 with respect to the first body 10 is such that a line connecting the head and the tail is located on a straight line, as seen in a top view.

The mass of the first body 10 can be greater than the mass of the second body 20. For example, if the weight of the first body 10 is 25 g, the weight of the second body 20 can be 10 g.

A curved portion 11 that tapers rearward as viewed from the up-down direction Z is formed on both the left and right sides of the rear-end portion 10b of the first body 10. A pair of first slits 12, 12 that extend along the left-right direction Y are formed spaced apart in the up-down direction Z at the rear-end portion 10b.

As shown in FIGS. 3 and 4, the first slit 12 has openings in the rear-end portion 10b and the curved portions 11 on both the left and right sides and penetrates the rear portion of the first body 10 in the left-right direction Y. The width dimension of the opening of the first slit 12 in the up-down direction Z is set so as to be at least greater than the thickness dimension of the first connecting member 40. A bottom portion (referred to as turn restricting end 12a) of the front side of the first slit 12 is located in front of a first rotary shaft 41, described further below, in the front-rear direction X.

As shown in FIGS. 5-8, the swing range (swing angle θ, fold angle) of the first connecting member 40, which turns about the first rotary shaft 41, when turning in one direction and in the opposite direction with respect to the initial position P0, in which the length direction coincides with the front-rear direction X, is greater than or equal to 90 degrees. That is, in the folded configuration P2, a second through-hole 40b on the rear side of the first connecting member 40, described further below, is positioned in front of the first rotary shaft 41. The reference symbols P1 and P2 shown in FIGS. 4, 6, 7, etc., indicate the postures during the swinging from the initial position P0, to the swimming configuration P1, and the folded configuration P2.

The first connecting member 40 is formed in a flat plate shape that is elongated in one direction, and is disposed in a state in which the longitudinal direction is oriented in the front-rear direction X, and the surface direction is oriented in a planar direction orthogonal to the up-down direction Z. The pair of first connecting members 40, 40 are disposed spaced apart in the up-down direction Z. The two longitudinal end portions of the first connecting member 40 are formed in an arc shape. Through-holes 40a, 40b that pass through the thickness direction are disposed on both sides of the first connecting member 40 in the longitudinal direction. The through-hole on the first body 10 side (front side) is the first through-hole 40a, and the through-hole on the second body 20 side (rear side) is the second through-hole 40b.

Further, for example, a stainless steel (SUS) magnetic body having magnetism is used as the first connecting member 40.

The first rotary shaft 41 having a circular cross section is provided on the rear-end portion 10b of the first body 10. The first rotary shaft 41 is disposed in the center position of the first body 10 in the left-right direction Y on the rear-end portion 10b side, with the axial direction oriented in the up-down direction Z. The first through-hole 40a on the front side of the first connecting member 40 is inserted into the first rotary shaft 41. That is, the first connecting member 40 is provided so as to be turnable about the first rotary shaft 41.

Further, as shown in FIG. 2, a magnet 50 (regulating member), which switches the swing range with respect to the first body 10 between a first swing range T1 during landing on the water and a second swing range T2 during flight, is disposed at the connecting portion connecting the first body 10 and the second body 20. Here, in the present embodiment, the swing angle of the first swing range T1 is θ1, and the swing angle of the second swing range T2 is θ2.

At the rear-end portion 10b of the first body 10, a housing portion 13 that is recessed forward is formed between the pair of first connecting members 40, 40, and the magnet 50 is fitted in this housing portion 13. The magnet 50 disposed in the housing portion 13 is disposed such that the magnetic force reaches the first connecting members 40, 40, which are made of magnetic bodies, in the initial position P0 arranged above and below the magnet 50, via a wall portion 10e between the housing portion 13 and the first slits 12. That is, the range over which the first connecting member 40 attempts to return to the initial position P0 due to the magnetic force of the magnet 50 is the first swing range T1.

By using stainless steel as the material for the first connecting member 40, the magnetic force of the magnet 50 to hold the first connecting member 40 can be slight, and the swing range can be effectively changed from the first swing range T1 to the second swing range T2 when a large turning force is applied.

Figure 6:
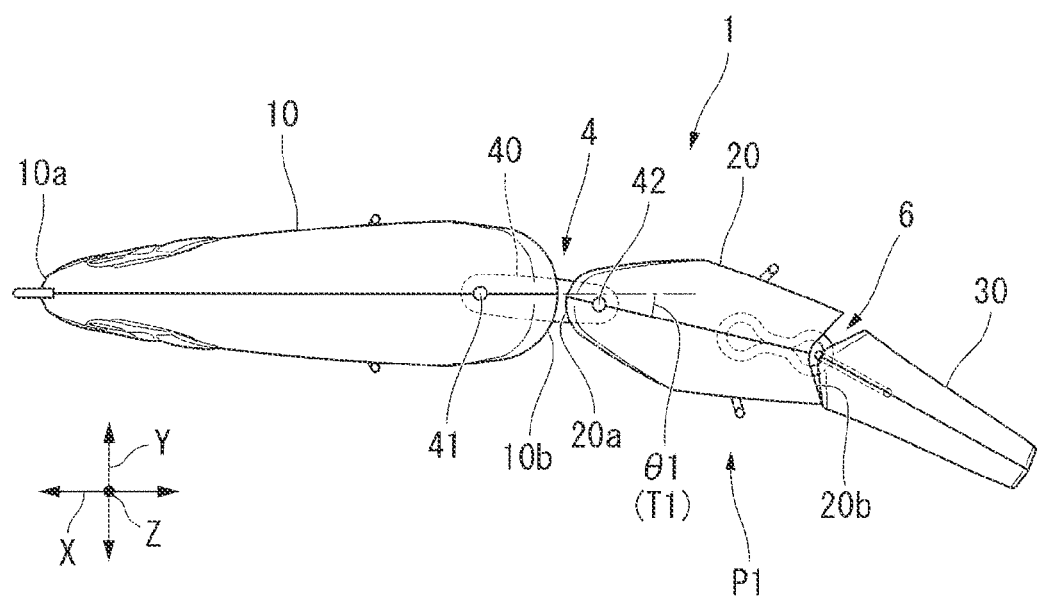
FIG. 6 is a plan view of the lure as seen from above and shows a swinging state in a swimming configuration.
Figure 7:
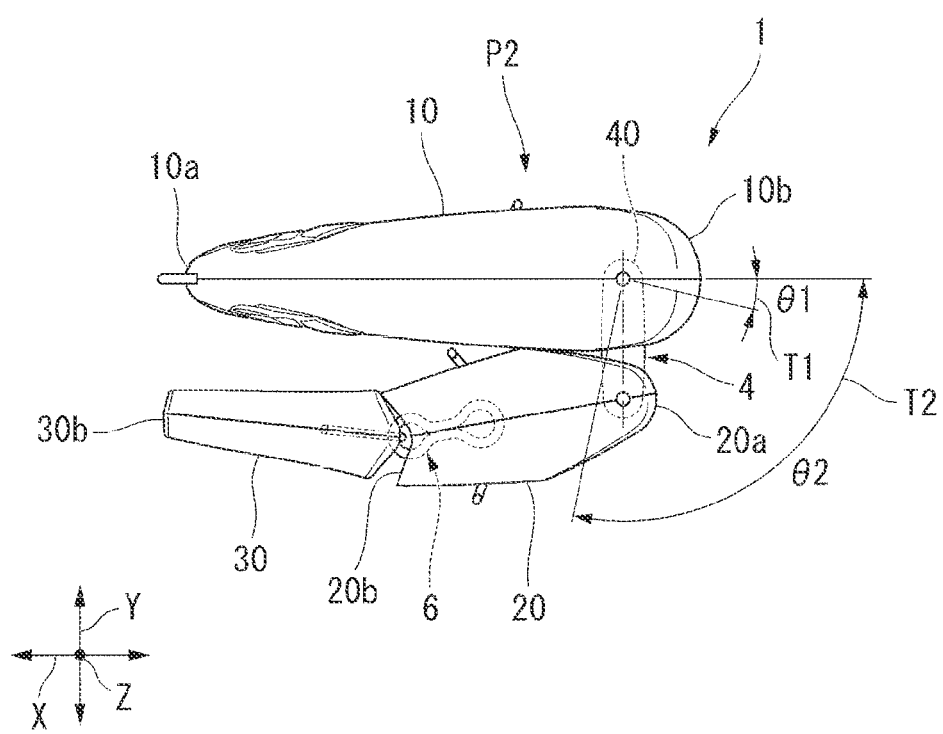
FIG. 7 is a plan view of the lure as seen from above and shows a state of folded configuration.
Figure 8:
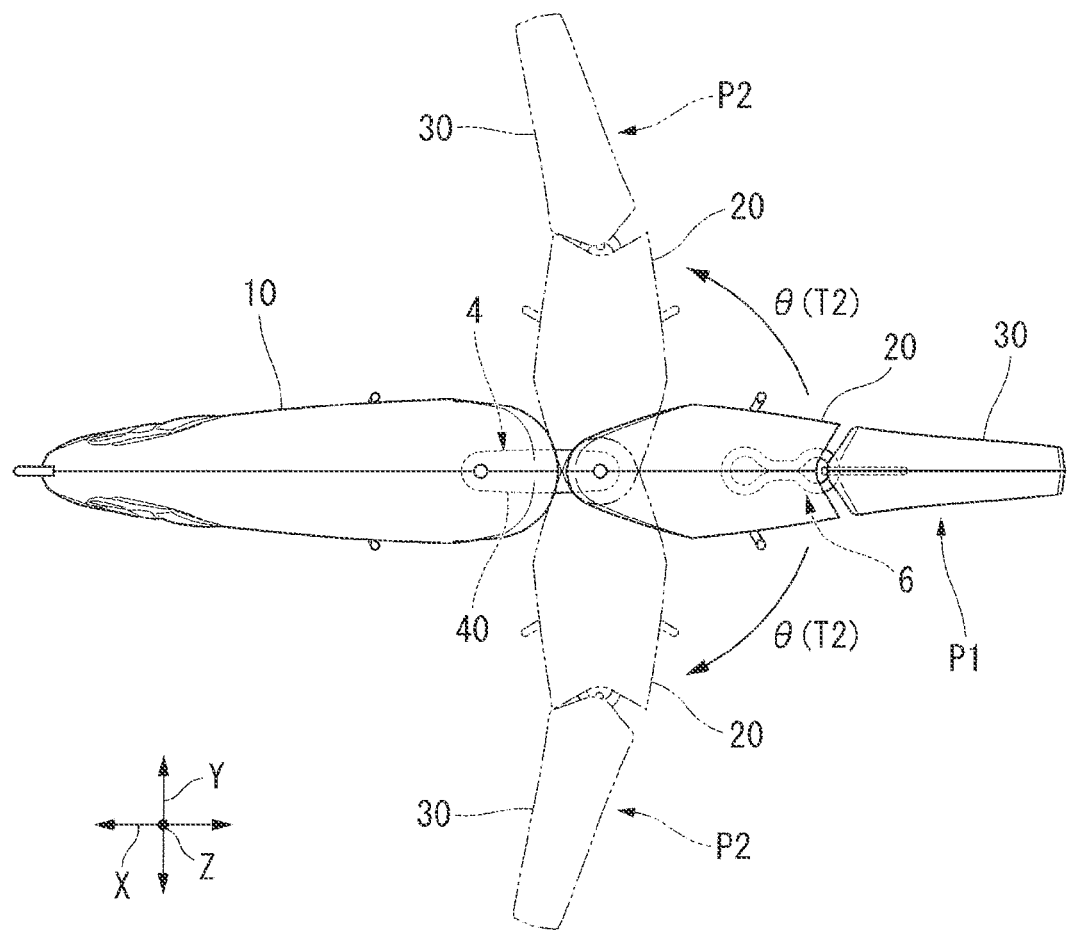
FIG. 8 is a plan view of the lure as seen from above, illustrating the swing range.

As shown in FIG. 6, the first swing range T1 is the range of the first swing angle θ1 for swinging that simulates swimming after landing on the water, starting from the position where the swing angle θ in the above-described initial position P0 is 0 degrees. As shown in FIG. 7, the second swing range T2, which is greater than the first swing range T1, is the range of a second swing angle θ2 at which the second body 20 is swung to adopt the folded configuration P2, in which the rear-end portion 20b of the second body 20 is folded toward the front-end portion 10a side of the first body 10, starting from the position where the swing angle θ in the above-described initial position P0 is 0 degrees. The first swing angle θ1 can be set to 60 degrees, for example. The second swing angle θ2 can be set to 150 degrees, which exceeds 90 degrees, for example.

As shown in FIGS. 1 and 2, the second body 20 and the third body 30 are formed in a shape simulating roughly the rear half of a fish. The second body 20 is connected to the rear-end portion 10b on the tail side of the first body 10. A front-end portion 20a of the second body 20 is connected to the rear-end portion 10b of the first body 10 by the above-described pair of upper and lower first connecting members 40, 40 so as to be swingable to the left and right.

A curved portion 21 that is tapered towards the front as viewed from the up-down direction Z is formed on both the left and right sides of the rear-end portion 20b of the second body 20. A pair of second slits 22, 22 that extend along the left-right direction Y are formed spaced apart in the up-down direction Z at the front-end portion 20a, and are arranged facing the rear of the above-described pair of first slits 12, 12.

As shown in FIGS. 3 and 4, the second slit 22 has openings in the rear-end portion 10b and the curved portions 21 on both the left and right sides, and penetrates the front portion of the second body 20 in the left-right direction Y. The width dimension of the opening of the second slit 22 in the up-down direction Z is set so as to be at least greater than the thickness dimension of the first connecting member 40, in the same manner as the first slit 12. A bottom portion (referred to as turn restricting end 22a) of the rear side of the second slit 22 is located in front of a second rotary shaft 42, described further below, in the front-rear direction X.

As shown in FIGS. 5-8, the respective swing range (swing angle θ, fold angle) of the first connecting member 40, which turns about the second rotary shaft 42, when turning in one direction and in the opposite direction with respect to the initial position P0, in which the length direction coincides with the front-rear direction X, becomes greater than or equal to 90 degrees. That is, in the folded configuration P2, the position of a second through-hole 40b on the rear side of the first connecting member 40 is in front of the second rotary shaft 42.

As shown in FIGS. 1 and 2, the second rotary shaft 42 having a circular cross section is provided on the front-end portion 20a of the second body 20. The second rotary shaft 42 is disposed in the center position of the second body 20 in the left-right direction Y on the front-end portion 10a side, with the axial direction thereof oriented in the up-down direction Z. The second rotary shaft 42 is inserted into the second through-hole 40b on the rear side of the first connecting member 40. That is, the first connecting member 40 is provided so as to be turnable about the second rotary shaft 42.

A second hook eye 16B, to which is connected a second hook 15B for hooking fish, is disposed on a lower portion 20c of the second body 20. The second body 20 is connected to the third body 30 via a rear connecting portion 6 so as to be turnable in the left-right direction Y.

As shown in FIG. 2, the rear connecting portion 6 has a first connecting ring 61 that is embedded in and supported by the rear-end portion 20b of the second body 20, and a second connecting ring 62 that is connected to the first connecting ring 61 so as to be swingable, and embedded in and supported by a front-end portion 30a of the third body 30. The first connecting ring 61 is shaped like spectacles including a pair of ring portions 61a, 61a, and is disposed such that the axial direction of the holes of the ring portions 61a are oriented in the up-down direction Z. One of the ring portions 61a protrudes from the rear-end portion 20b of the second body 20. The second connecting ring 62 is shaped like spectacles including a pair of ring portions 62a, 62a, and is disposed such that the axial direction of the holes of the ring portions 62a are oriented in the left-right direction Y. One of the ring portions 62a protrudes from the front-end portion 30a of the third body 30.

Connecting the ring portions 61a, 62a that face each other connects the third body 30 to the second body 20 so as to be swingable.

The third body 30 is provided so as to be turnable in the left-right direction Y with respect to the rear-end portion 20b of the second body 20 via a rear connecting portion 6.

As shown in FIGS. 2 and 4, the tail, which is not shown in the figures, is formed from a soft material, such as rubber or silicon, the entirety thereof being integrally formed. The tail attached to the third body 30 can swing to the left and right with respect to a rear-end portion 30b of the third body 30.

Figure 9:
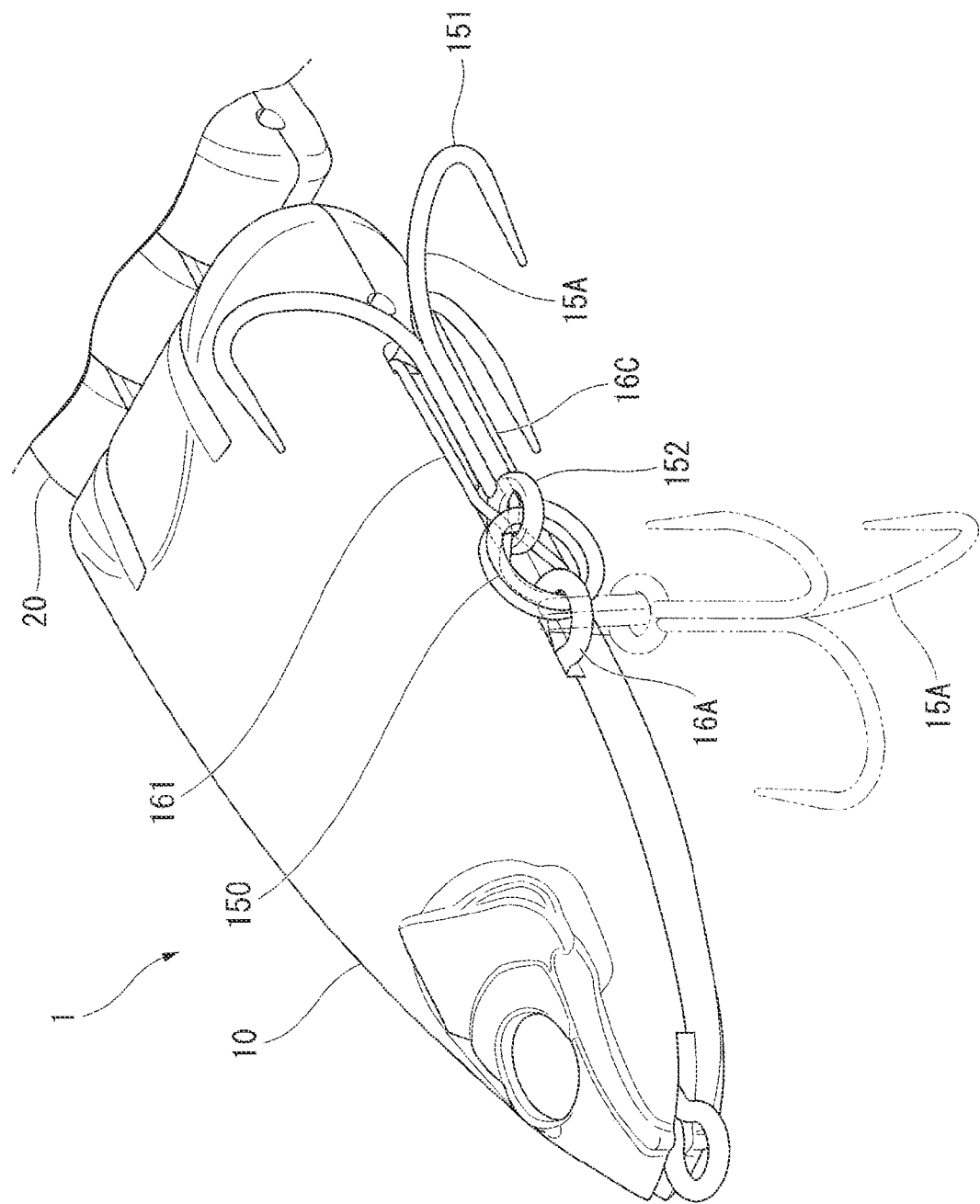
FIG. 9 is a perspective view showing a state in which a first hook of the first body is engaged with a hook engagement portion.

As shown in FIG. 9, a hook engagement portion 16C, which engages the first hook 15A behind the first hook eye 16A, is disposed in the lower portion 10c of the first body 10.

The first hook 15A has a barb and shank portion 151 composed of three barbs and shanks, and a ring portion 152 that connects the needle portion 151 to the first hook eye 16A via a ring-shaped connecting metal fitting 150.

The hook engagement portion 16C has a clip 161 made of a left and right pair of rods extending in the front-rear direction X. The hook engagement portion 16C is configured to be capable of locking the first hook 15A by contact resistance caused by sandwiching a ring portion 152 of the first hook 15A between the rods of the clip 161.

Next, the operation of the lure 1 configured in this manner will be described in detail based on the drawings.

In the lure 1 according to an embodiment of the present embodiment, as shown in FIGS. 5-8, because the swing angle θ of the swing range (second swing range T2) when the lure is in the folded configuration P2, in which the second body 20 is folded with respect to the first body 10, is in a range that exceeds 90 degrees on both the left and right sides, the lure 1, when in flight, adopts the folded configuration P2, in which the tail side (rear-end portion 20*b*) of the second body 20 is folded toward the head side (front-end portion 10*a*) of the first body 10 on either the left or the right side of the lure 1 via the connecting portion 4, and, after landing on the water, adopts the swimming configuration P1, in which the head side (front-end portion 20*a*) of the second body 20 faces toward the tail side (rear-end portion 10*b*) of the first body 10.

That is, in the present embodiment, it is possible to stabilize both the configuration at the time of flight and the configuration at the time of landing on the water.

Further, by the lure 1 according to an embodiment of the present embodiment, at the time of flight of the lure 1, the lure adopts the folded configuration P2, in which the second body 20 is folded with respect to the first body 10, and the center of gravity of the lure 1 shifts to the front side, thereby making it possible to increase the flight distance.

On the other hand, when the lure 1 lands on the water, the second body 20 returns to the rear-side position with respect to the first body 10, and the swing angle θ is less than or equal to 90 degrees, and a stable configuration P1 is realized.

Further, in the present embodiment, by presence or absence of a magnetic force of the magnet 50, the swing range of the connecting portion 4 can be switched between the first swing range T1 when the lure 1 lands on the water, and the second swing range T2, which is wider than the first swing range T1, when the lure 1 is in flight, and it is thus possible to stabilize both the configuration at the time of flight and the configuration at the time of landing on the water.

Further, in the present embodiment, when the lure 1 is in flight, the swing range is the second swing range T2, and the lure adopts the folded configuration P2, in which the second body 20 is folded with respect to the first body 10, and the center of gravity of the lure 1 shifts to the front side, and thus the flight distance can be increased. When the lure 1 lands on the water, on the other hand, the second body 20 returns to the rear-side position with respect to the first body 10, and a stable swimming configuration P1 in the first swing range T1 can be realized.

Further, in the present embodiment, because the first body 10 on the head side is heavier than the second body 20 on the tail side, when the lure 1 is cast, due to air resistance the second body 20 precedes the first body 10 in the direction of flight. Therefore, it is possible to achieve a folded configuration P2 in which the tail side (rear-end portion 20*b*) of the second body 20 is more reliably folded toward the head side (front-end portion 10*a*) of the first body 10 via a first connecting portion 4.

Further, because the present embodiment is configured such that the first body 10 and the second body 20 each swing with respect to the first connecting member 40, it is possible to more reliably achieve the folded configuration P2 of the second swing range T2 in which the tail side (rear-end portion 20*b*) of the second body 20 is folded toward the head side (front-end portion 10*a*) of the first body 10.

Further, in the present embodiment, it is possible to cause the first connecting member 40 to be attracted to the magnet 50 by magnetic force when the lure 1 lands on the water. That is, the turning of the first connecting member 40 is regulated such that the first connecting member 40 does not swing significantly so that the second body 20 adopts the folded configuration P2 in the second swing range T2, and can make small swings in the first swing range T1 in which the swimming configuration P1 is adopted.

Further, in the present embodiment, even if the third body 30 is provided, it is possible to achieve a stable posture both during flight and when the lure 1 lands on the water, in the same manner as described above.

Further, in the present embodiment, since the first hook 15A provided on the first body 10 is engaged with the hook engagement portion 16C so as to be fixed and not move, when the lure 1 adopts the folded configuration P2 at the time of flight, the first hook 15A of the first body 10 can be prevented from becoming entangled with the second hook 15B of the second body 20, for example. As a result, the flight attitude can be stabilized, thereby achieving the desired flight distance.

Further, the first hook 15A does not disengage from the hook engagement portion 16C even when the lure 1 lands on the water, and disengages from the hook engagement portion 16C only when a fish bites. As a result, there is the advantage that even when the lure 1 is made to swim and enters an unstable state as a result of being tossed by waves, etc., it is possible to prevent such problems as the barb and shank of the first hook 15A becoming entangled with other structural parts.

By the lure 1 according to embodiments of the present invention configured as described above, it is possible to stabilize the configuration both during flight and after landing on the water, while ensuring a long flight distance.

Next, the second embodiment and modified examples of the lure according to the present disclosure will be described. Compositional elements that have the same functions as the compositional elements of the above-described first embodiment are given the same reference numerals and detailed explanations thereof are omitted to avoid redundant descriptions.

Embodiment 2

Figure 10:
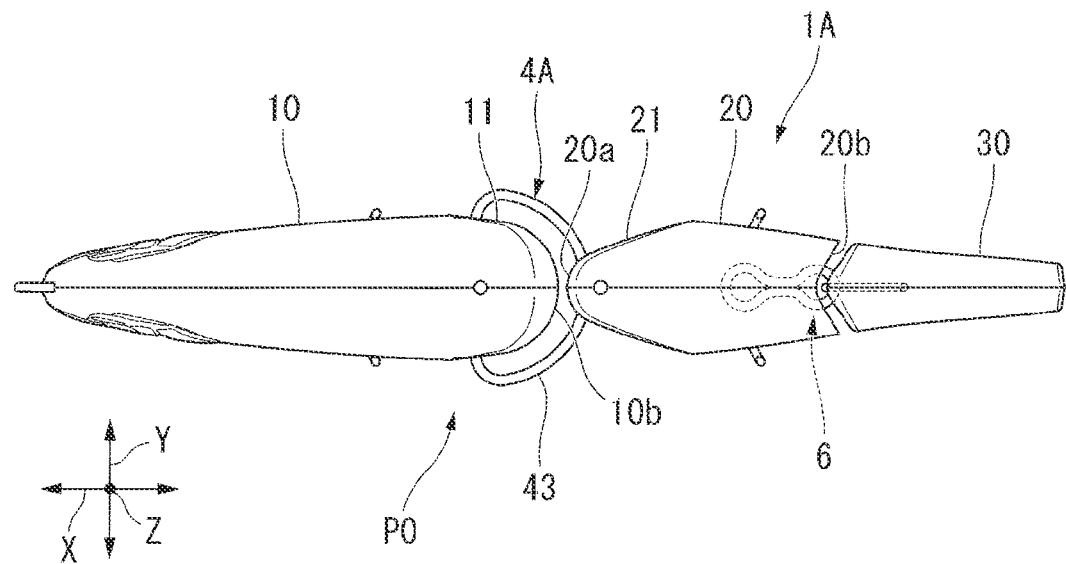
FIG. 10 is a plan view of the lure as seen from above according to a second embodiment.
Figure 11:
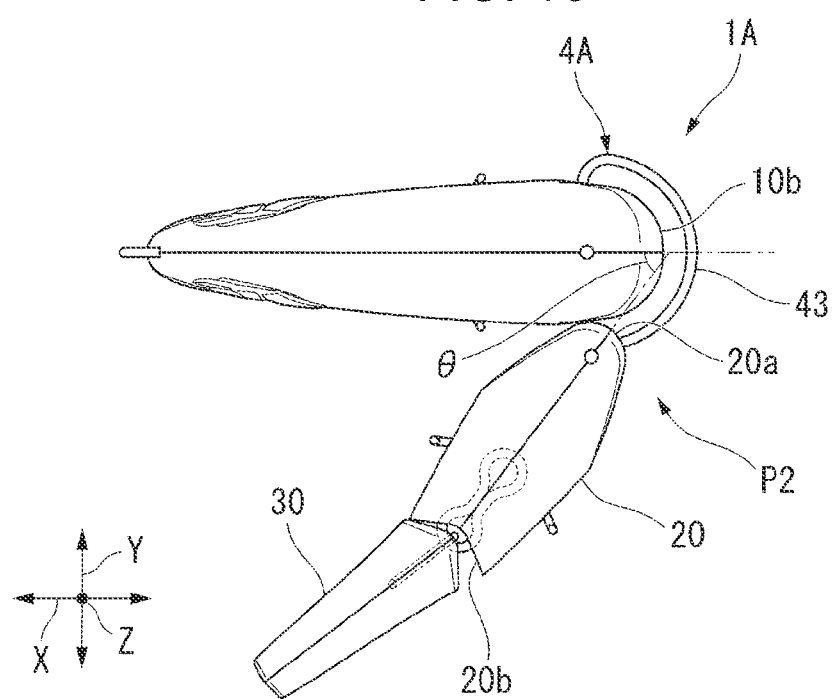
FIG. 11 is a plan view of the lure as seen from above, showing the folded configuration state.

Next, a lure 1A according to the second embodiment shown in FIGS. 10 and 11 is configured such that the first connecting portion 4 (refer to FIG. 2) having the first connecting member 40 of the first embodiment described above is replaced with a second connecting portion 4A provided with a rail-shaped connecting rail 43.

The connecting rail 43 connects the second body 20 to the rear-end portion 10*b* of the first rail portion 10 so as to be swingable to the left and right. The connecting rail 43 is formed of a metal member, such as a wire. The connecting rail 43 is disposed such that the longitudinal direction of the connecting rail 43 is oriented horizontally, and is curved so as to encompass the left and right curved portions 11, 11 from the rear over a prescribed interval, and fixed to the rear portion of the first body 10. The two end portions of the connecting rail 43 are respectively fixed to positions on the front sides of the curved portion 11 on both the left and right sides of the first body 10. That is, the region where the connecting rail 43 is disposed is the region in the rear portion of the first body 10, from both side surfaces to the rear-end portion 10*b* side. Specifically, it is a position in which the direction of the tangents between the first body 10 and each end portion of the connecting rail 43 faces the front-rear direction X (direction orthogonal to the left-right direction Y), or a position in which the direction of tangents faces, from the rear to the front, the left and right center side of the first rail portion 10.

The front-end portion 20*a* of the second body 20 is connected so as to be able to move by being guided by the connecting rail 43. That is, for example, a penetrating portion (not shown), through which the connecting rail 43 is passed, is disposed on the front-end portion 20a of the second body 20, and the connecting rail 43 is passed through and connected to this penetrating portion. The second body 20 moves along the connecting rail 43, and thus swings within a prescribed swing range (swing angle θ). As shown in FIG. 11, because the arrangement region of the connecting rail 43 is in the range described above, the swing angle θ of the second body 20 is an angle exceeding 90 degrees, thereby making it possible to adopt the folded configuration P2.

In the lure 1A according to the second embodiment configured in this manner, it is not necessary to provide the slits 12, 12, or the rotary shafts 41, 42, which turnably support the first connecting member 40, as in the first embodiment described above. Therefore, it is possible to reduce the cost and labor required for processing the first body 10 and the second body 20, and to realize a simple configuration.

First Modified Example

Figure 12:
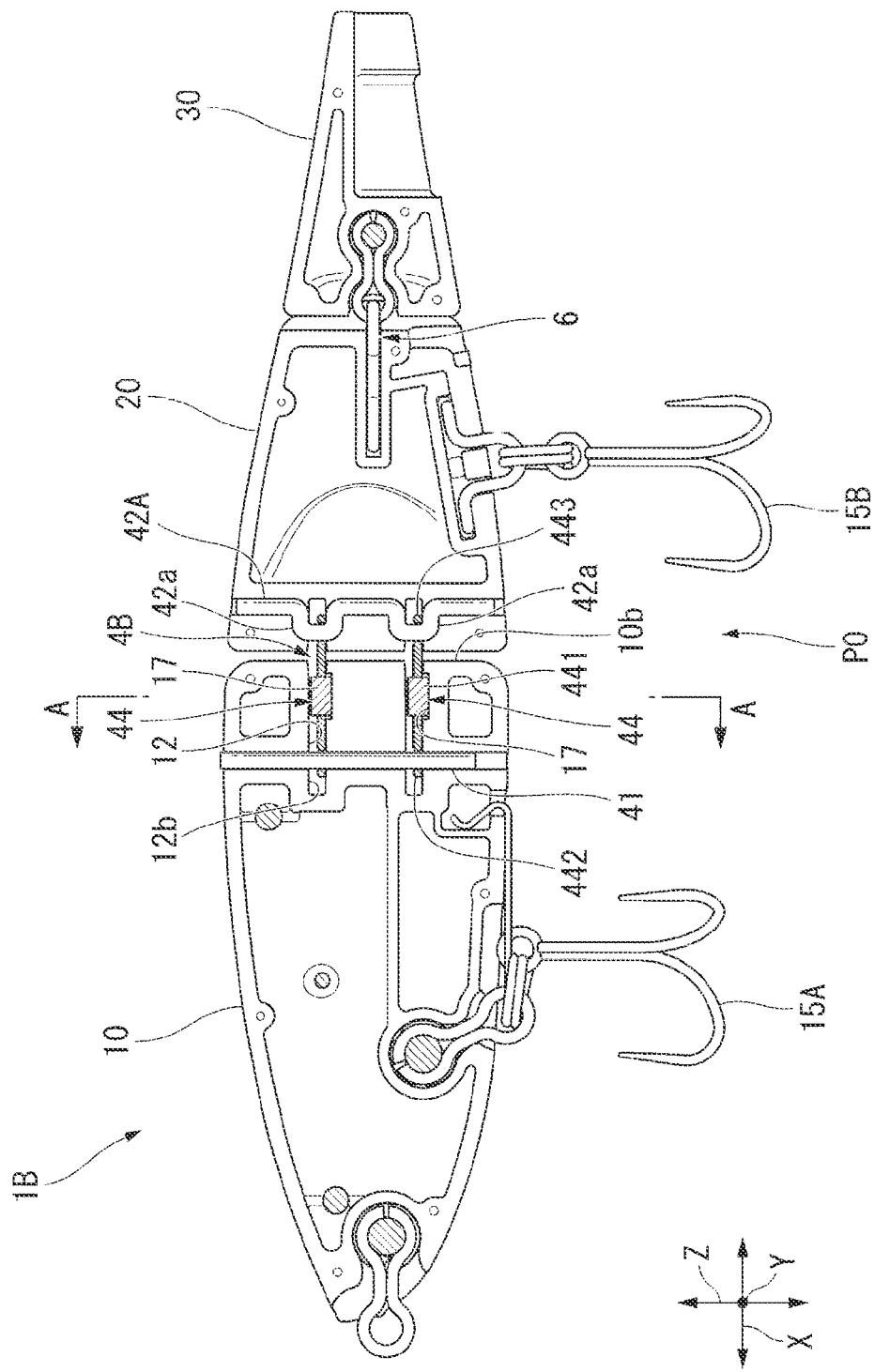
FIG. 12 is a longitudinal section of the lure according to a first modified example.
Figure 13:
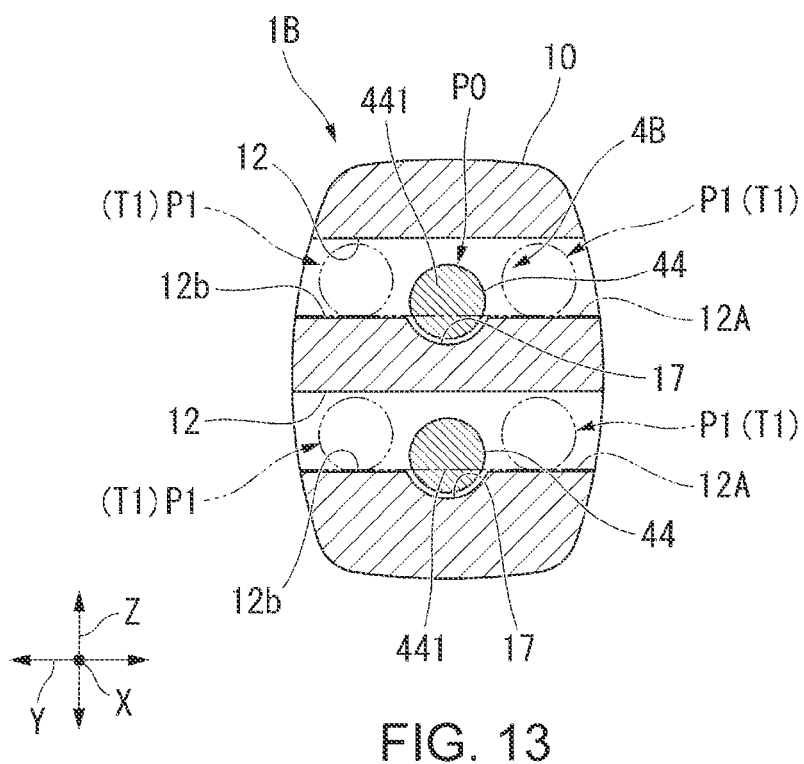
FIG. 13 is a cross section along line A-A in FIG. 12.

Next, a lure 1B according to the first modified example shown in FIGS. 12 and 13 is configured such that the first connecting member 40 of the first embodiment described above is replaced with a third connecting portion 4B provided with a pair of swivel-shaped upper and lower second connecting members 44. A pair of second connecting members 44, 44 are respectively disposed in the first slit 12 disposed on the first body 10 and the second slit 22 disposed on the second body 20.

Figure 14:
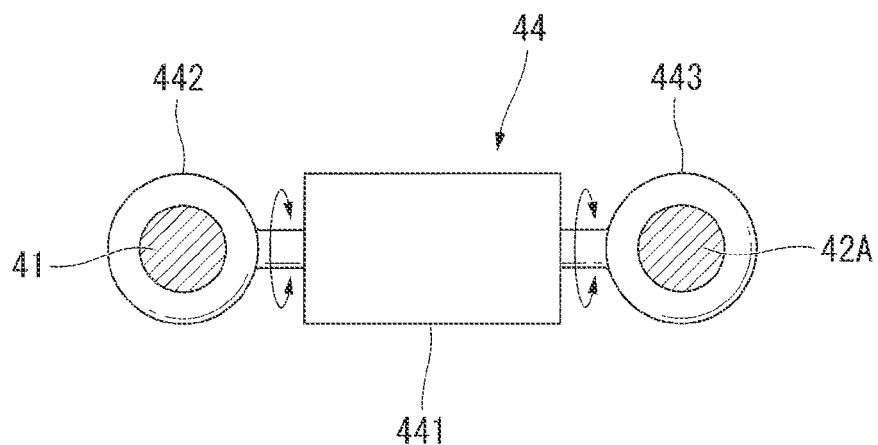
FIG. 14 is a side view showing the configuration of a second connecting member of the connection portion shown in FIG. 12.

As shown in FIGS. 12-14, the second connecting member 44 has a cylindrical shaft portion 441, and swivel rings 442, 443 that are arranged on both sides of the shaft portion 441 and that can rotate about the central axis of the shaft portion 441. The swivel rings 442, 443 are each formed in a ring shape. A first rotary shaft 41 disposed on the rear-end portion 10b of the first body 10 is inserted into one swivel ring, that is, a first swivel ring 442, and a second rotary shaft 42 provided on the front-end portion 20a of the second body 20 is inserted into the other, that is, a second swivel ring 443.

As shown in FIG. 12, the first modified example has a bent portion 42a that is convex toward the front in a position at which the second swivel ring 443 of the second rotary shaft 42 is supported. That is, the second swivel ring 443 is set so as to be inserted in the bent portion 42a of the second rotary shaft 42, and to move up and down only within the range of the convex shape of the bent portion 42a.

As shown in FIG. 13, a receiving groove 17 (regulating member, holding portion, recess) for receiving the shaft portion 441 of the second connecting member 44 from below is disposed on a lower inner surface 12b of the first slit 12. The receiving groove 17 is formed on a curved surface having essentially the same shape as the peripheral surface of the shaft portion 441. When the lure 1B is in the initial position P0, the shaft portion 441 is fitted in the receiving groove 17 in an engaged state, thereby restricting the movement of the shaft portion 441 and restricting the swinging of the second body 20. The groove depth (step size) of the receiving groove 17 is arbitrarily set to a dimension with which the shaft portion 441 can come out of the receiving groove 17 when a prescribed swinging force acts on the first body 10 and the second body 20. The chain double-dashed line of FIG. 13 shows, for example, the shaft portion 441 detached from the receiving groove 17 in the configuration P1.

Further, the first body 10 has a swing support portion 12A that supports the second connecting member 44 so as to be swingable in the first swing range T1 in which the swimming configuration P1 is adopted. That is, the chain double-dashed line shown in FIG. 13 indicates the swing support portion 12A forming a straight line along the lower inner surface 12b of the first slit 12 of the first body 10.

In the lure 1B according to the first modified example configured in this manner, a state in which the shaft portion 441 of the second connecting member 44 is fitted and engaged with the receiving groove 17, formed in the first slit 12 of the first body 10 when the lure 1B lands on the water, is maintained. That is, the turning of the second connecting member 44 is regulated such that the second connecting member 44 does not swing significantly so that the second body 20 adopts the folded configuration P2 at a prescribed swing angle, and can make small swings in the swing range in which the swimming configuration P1 is adopted.

Second Modified Example

Figure 15:
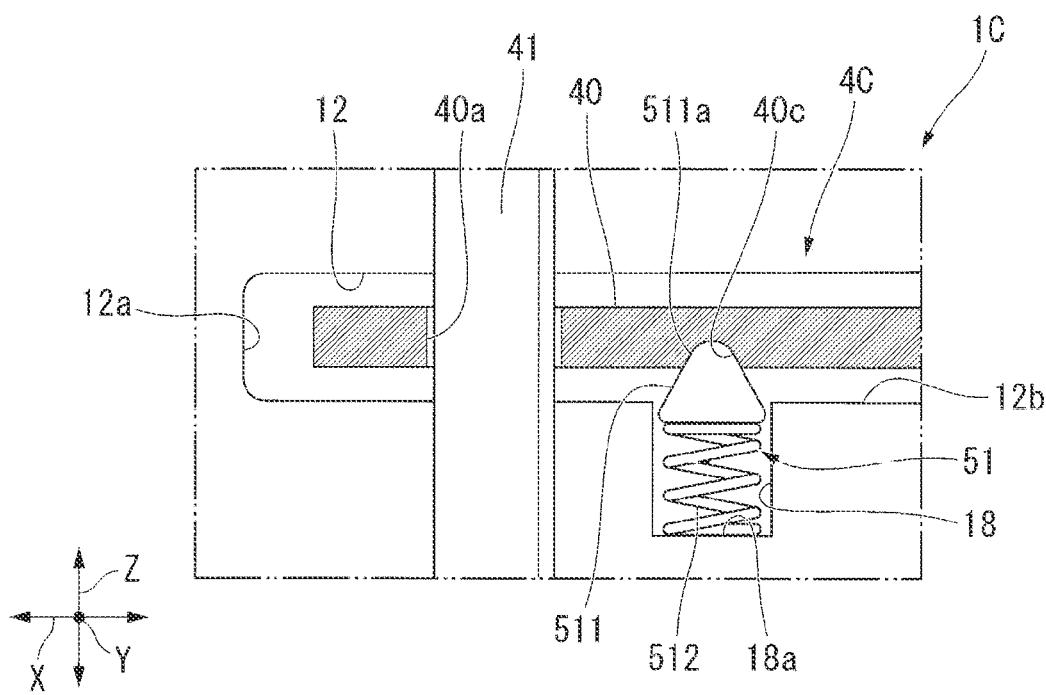
FIG. 15 is a cross section showing the configuration of the main connecting portion according to a second modified example.

Next, as shown in FIG. 15, a lure 1C according to a second modified example is configured such that the magnet 50 of the first embodiment is replaced with a pressing member 51 (regulating member).

A housing portion 18 formed recessed at a position rearward of the first rotary shaft 41 is disposed in the lower inner surface 12b of the first slit 12 of the first body 10. A locking recess 40c is formed on the lower surface of the first connecting member 40 of the first connecting portion 4, rearward of the first through-hole 40a. The locking recess 40c is formed recessed in an essentially conical shape. The housing portion 18 and the locking recess 40c are in positions facing each other in the up-down direction Z when in the initial position P0.

The depth (step size) of the locking recess 40c is arbitrarily set to a dimension with which the locking recess 40c can be detached from a pressing body 511 of the pressing member 51, that is, with which the engagement between the locking recess 40c and the pressing body 511 can be released, when a prescribed swinging force acts on the first body 10 and the second body 20.

The pressing member 51 has the pressing body 511, and a spring member 512 that biases the pressing body 511 upward from below by a spring force. The pressing body 511 has an essentially conical shape in which the upper side is tapered. A distal end portion 511a of the pressing body 511 is capable of fitting into and being pressed against the locking recess 40c of the first connecting member 40.

A spring is employed as the spring member 512, and one end thereof in the axial direction of the spring is fixed to the lower surface of the pressing body 511. Then, the spring member 512 is housed in the housing portion 18 disposed in the first slit 12, with the biasing direction of the spring oriented in the up-down direction Z.

In the lure 1C according to the second modified example configured in this manner, when a prescribed swinging force acts on the first body 10 and the second body 20 in the initial position P0, the first connecting member 40 passes over the pressing body 511 against the biasing force of the spring of the pressing member 51, and the connection between the locking recess 40c and the pressing body 511 is released. When this connection is released, the swing range is switched from that of the swimming configuration P1 to that of the folded configuration P2.

Further, when the lure 1C lands on the water, the state in which the pressing body 511 of the pressing member 51 indisposed in the housing portion 18 of the first slit 12 of the first body 10 is pressed against and fitted into the locking recess 40c of the first connecting member 40 by the biasing force of the spring of the spring member 512 is maintained. That is, the turning of the first connecting member 40 is regulated such that the first connecting member 40 does not swing significantly, so that the second body 20 adopts the folded configuration P2 at a prescribed swing angle and can make small swings in the swing range in which the swimming configuration P1 is adopted.

Third Modified Example

Figure 16:
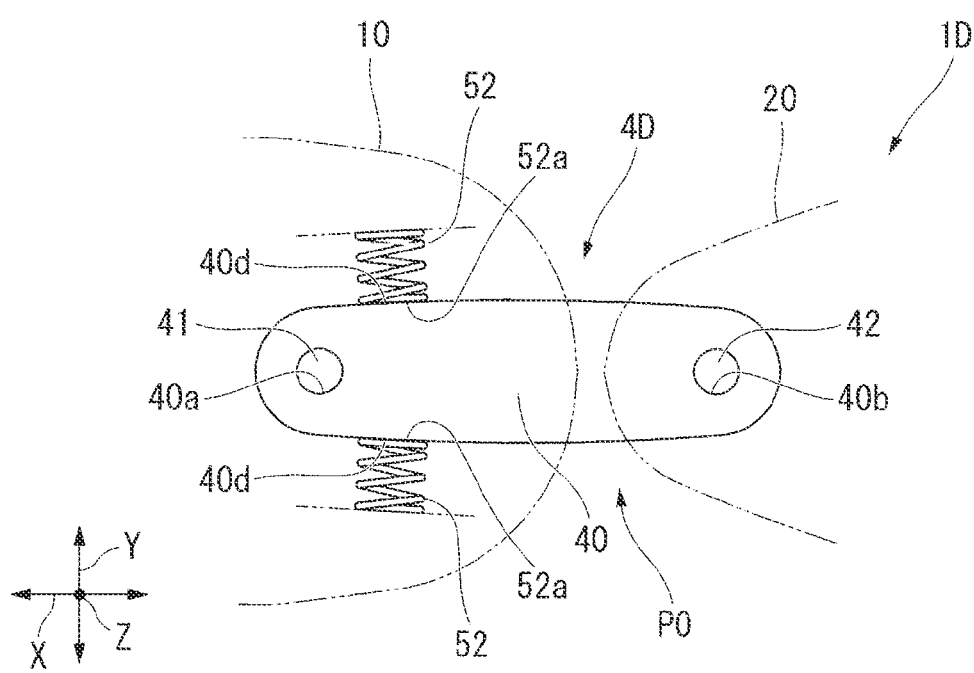
FIG. 16 is a plan view showing the configuration of the main connecting portion, as seen from above, according to a third modified example.

As shown in FIG. 16, a lure 1D according to a third modified example is configured such that the magnet 50 of the first embodiment is replaced with a left and right pair of spring members 52, 52 (regulating member).

A spring is employed as the spring member 52, which is disposed in the first body 10 in a state in which the axial direction of the spring is oriented essentially in the left-right direction Y. A spring distal end portion 52a of the spring member 52 is fixed to a side end portion 40d of the first connecting member 40 rearward of the first rotary shaft 41. The left and right pair of spring members 52, 52 are provided in a state in which spring force does not act when in the initial position P0 and are set such that when a prescribed swinging force that is greater than the spring force acts on the first connecting member 40 either to the left or to the right, one spring member 52 expands and the other spring member 52 contracts.

In the lure 1D according to the third modified example configured in this manner, when a prescribed swinging force that is greater than the spring force acts on the first body 10 and the second body 20 in the initial position P0, the first connecting member 40 resists the biasing force of the springs of the pair of spring members 52, 52 and the first connecting member 40 turns, thereby switching from the swing range of the swimming configuration to the swing range of the folded configuration P2.

Further, when the lure 1C lands on the water, the first connecting member 40 is maintained in a neutral position (that is, the initial position P0) by the spring force of the left and right pair of spring members 52, 52. That is, the turning of the first connecting member 40 is regulated such that the first connecting member 40 does not swing significantly so that the second body 20 adopts the folded configuration P2 at a prescribed swing angle, and can make small swings in the range in which the swimming configuration is adopted.

Fourth Modified Example

Figure 17:
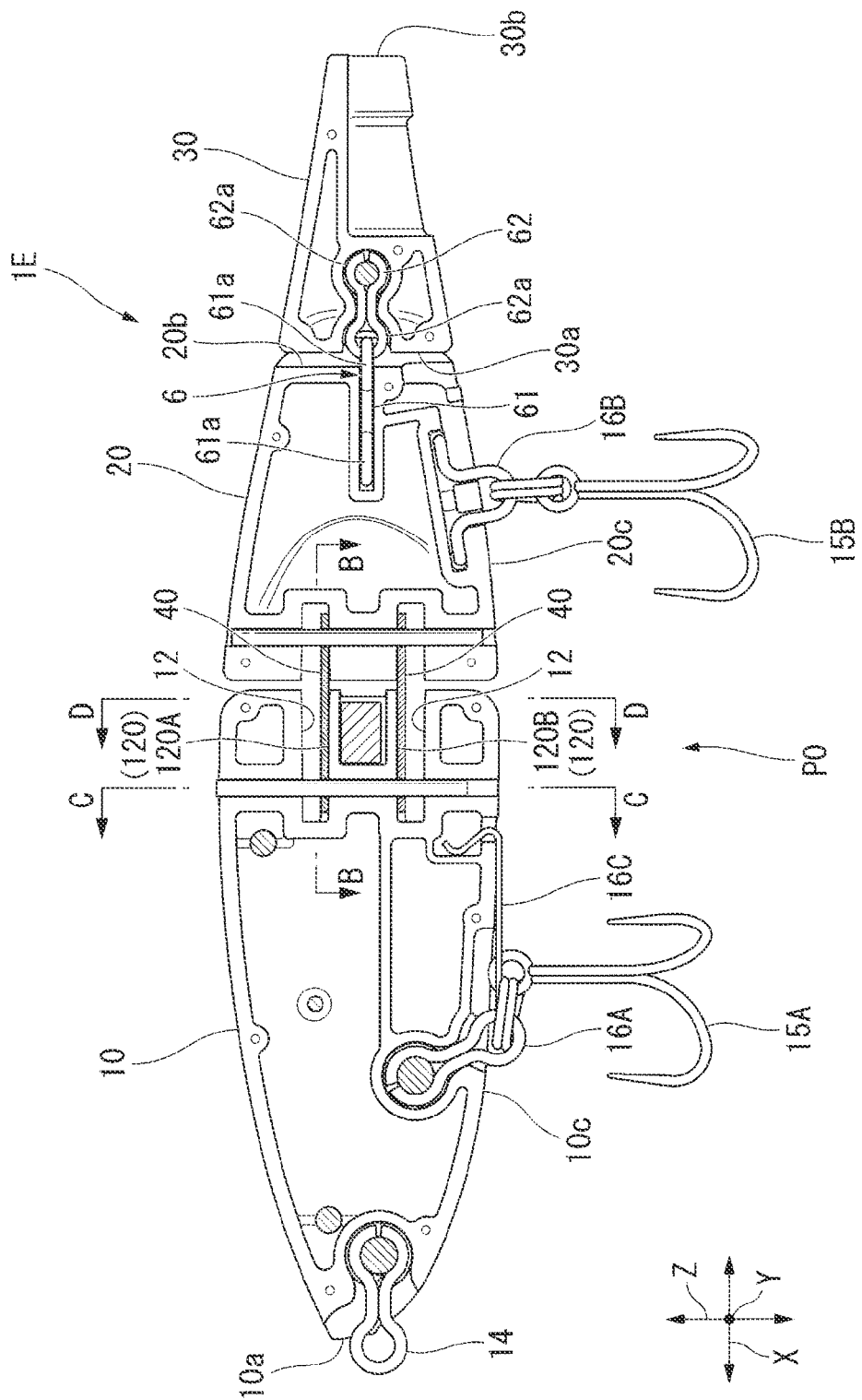
FIG. 17 is a longitudinal section that passes through the center of the lure in the left-right direction according a fourth modified example.
Figure 18:
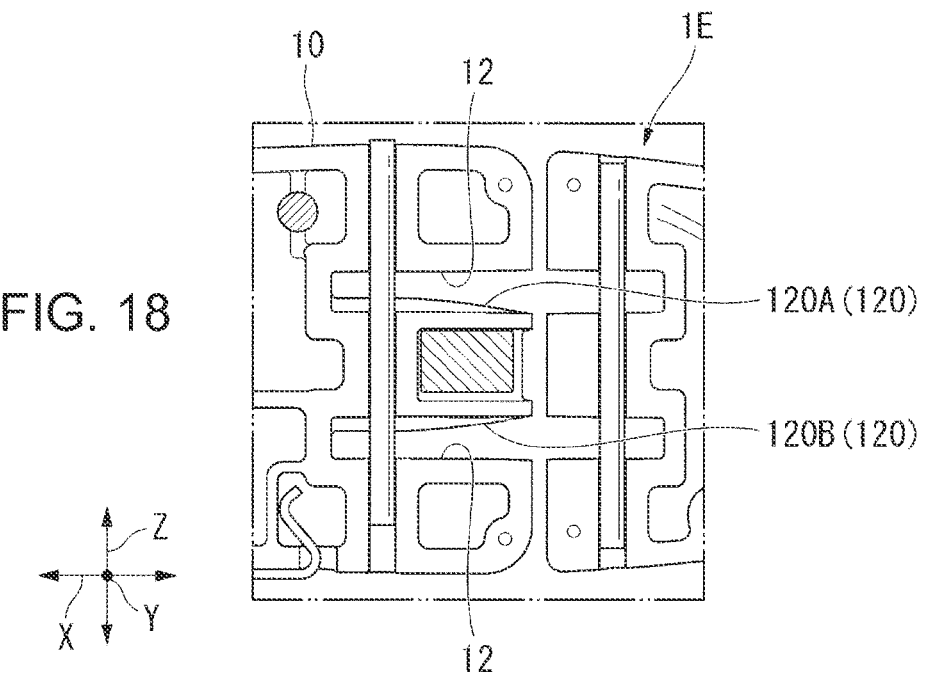
FIG. 18 is an enlargement of the main part of a first slit portion shown in FIG. 17, from which the first connecting member has been omitted.
Figure 19:
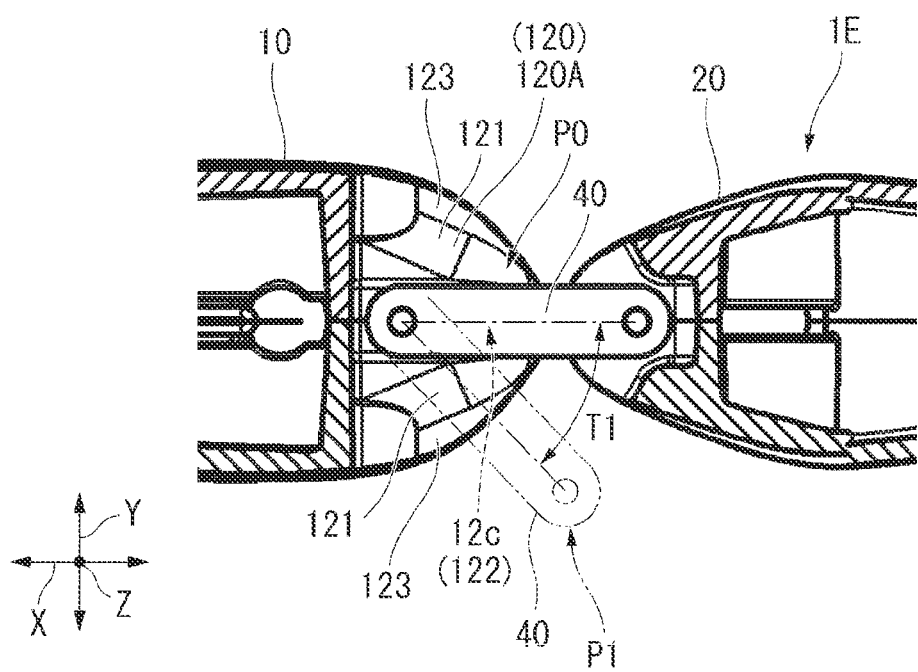
FIG. 19 is a cross section along line B-B in FIG. 17.
Figure 21:
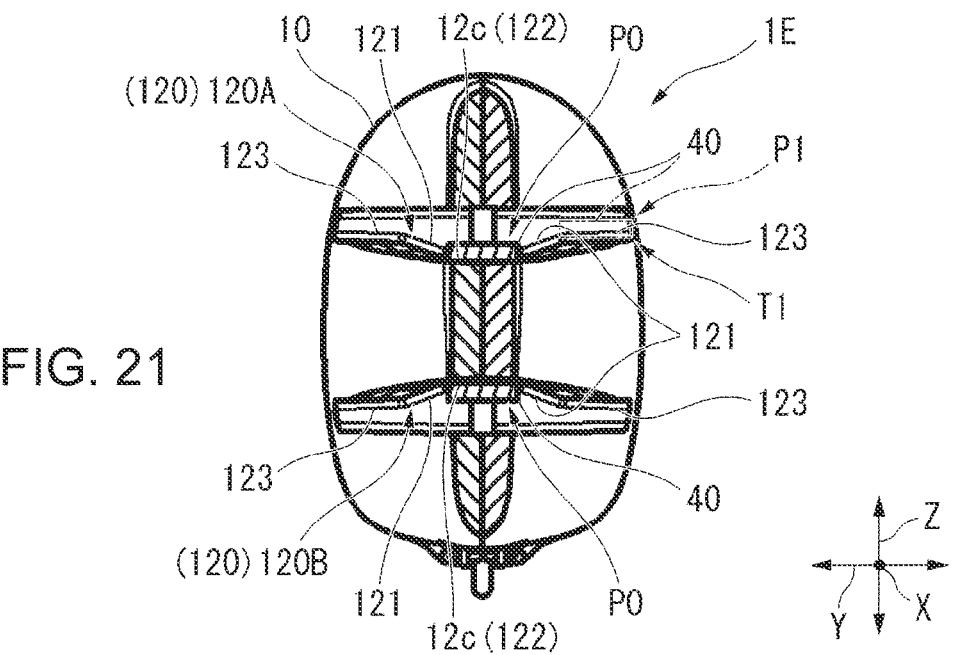
FIG. 21 is a cross section along line D-D in FIG. 17.

A lure 1E according to the fourth modified example shown in FIGS. 17 and 21 is configured such that the first slit 12 of the first body 10 according to the embodiments described above is deformed, and the upper and lower pair of first slits 12 each has a guiding portion 120 (swing support portion) that guides the first connecting member 40 to a center of swing 12c (holding portion), which is the initial position P0.

The guiding portions 120 (120A, 120B) of each of the first slits 12 are formed on the inner surface of the first body 10 close to the center thereof in the up-down direction Z. That is, with respect to the pair of first slits 12, the guiding portion 120A of the first slit 12 on the upper side is located on the lower surface of the slit and the guiding portion 120B of the first slit 12 on the lower side is located on the upper surface of the slit. The guiding portions 120A, 120B support the first connecting member 40 so as to be swingable in the first swing range T1 in which the swimming configuration P1 is adopted.

Figure 20:
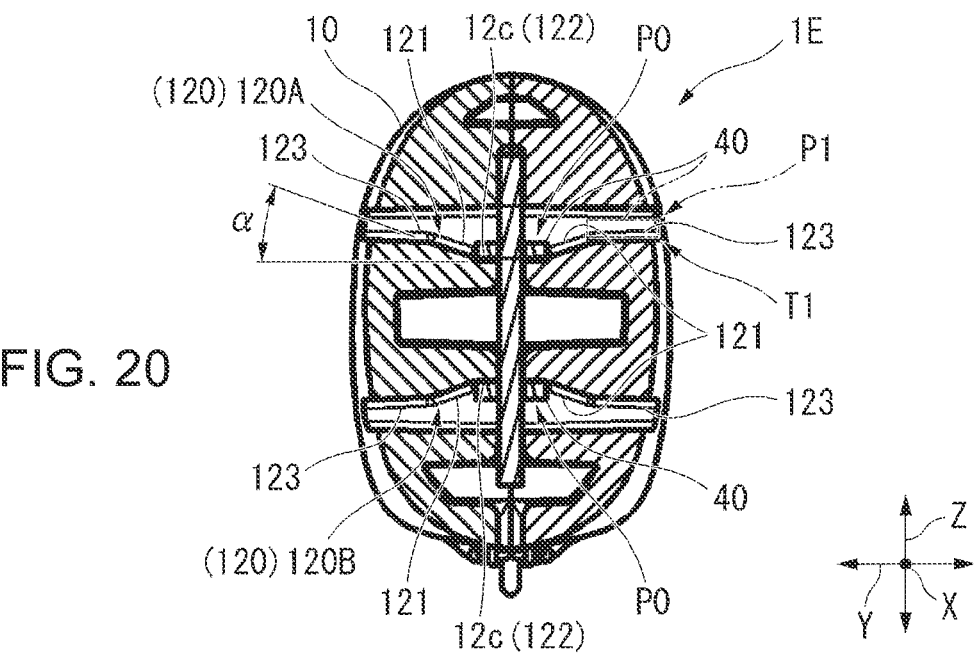
FIG. 20 is a cross section along line C-C in FIG. 17.

The guiding portion 120 has an inclined surface 121 (regulating member) that is disposed in the central portion in the left-right direction Y and that is inclined toward a holding portion (center of swing 12c) that holds the first connecting member 40 at the initial position P0. That is, the guiding portion 120 has a swing regulating portion 122 that corresponds to the center of swing 12c located at the central position in the left-right direction Y, a pair of the inclined surfaces 121 located on both the left and right sides of the swing regulating portion 122, and a horizontal surface 123 that further extends along the left-right direction Y on both the left and right sides of the pair of inclined surfaces 121. The swing regulating portion 122 is a flat surface that extends in the left-right direction Y as viewed from the front-rear direction X and is set to have the same or a slightly larger width dimension in the left-right direction Y as that of the first connecting member 40. The inclined surface 121 is inclined toward the center in the up-down direction Z from the front to the rear, at the center of swing 12c. Further, the left and right inclined surfaces 121 are each inclined at a prescribed angle α (refer to FIG. 20) of approximately 20°, for example, so as to extend toward the center in the up-down direction Z proximately with the swing regulating portion 122 in the left-right direction Y.

In this manner, in the fourth modified example, the inclined surface 121 of the guiding portion 120 regulates the first connecting member 40 to be held at the center of swing 12c of the second swing range T2. As a result, the lure 1E can easily return to the initial position P0 while swinging in the swimming configuration P1 in the first swing range T1 and be maintained at the neutral position (that is, the initial position P0).

Further, the turning of the first connecting member 40 is regulated such that the first connecting member 40 does not swing significantly so that the second body 20 adopts the folded configuration P2 at a prescribed swing angle, and can make small swings in the first swing range T1 in which the swimming configuration P1 is adopted.

While embodiments of the lure according to the present invention have been described, these embodiments have been presented only as examples and are not intended to limit the scope of the invention. The embodiments may be implemented in a variety of other forms; furthermore, various omissions, substitutions and changes may be made without departing from the scope of the invention. Embodiments and modifications thereof include those that can be easily conceived of by a person skilled in the art, those that are essentially the same, and those that are equivalent in scope.

For example, the above-described embodiments have a first configuration in which the swing angle θ is in a range exceeding 90 degrees on both the left and right sides, and a second configuration in which the first swing range T1 in which the connecting portion 4 swings as if to swim when landing on the water, and the second swing range T2, which is wider than the first swing range T1, and in which it adopts the folded configuration P2, can be switched by the magnet 50 (regulating member), but the invention is not limited to having both the above-described first configuration and the second configuration, and it is sufficient if the invention has at least one of the first configuration and the second configuration.

Further, in the present embodiment, the mass of the first body 10 is set so as to be larger than the mass of the second body 20, and the second body 20 thereby precedes the first body 10 in the direction of flight due to air resistance when the lure is in flight, which is preferable, but the invention is not limited to the first body 10 being heavier than the second body 20. The first body 10 may have the same mass as the second body 20, or the second body 20 may have a smaller mass than the first body 10.

Further, configurations such as the shapes, forms, quantities, etc., of the connecting portion, connecting member, and the regulating member shown in the present embodiments can be arbitrarily set in accordance with the shape of the lure (fish-like) or conditions such as the swing range, the method of swing, and the like.

Further, the embodiments described above are configured such that the hook engagement portion 16C which engages with the first hook 15A is provided in the first body 10, but the invention is not limited to providing this portion in the first body 10, and it is possible to provide the hook engagement portion 16C, which engages with the hook in at least one of the first body 10 and the second body 20.

Further, the lures of the present embodiments are configured to be divided into three parts in the front-rear direction, that is, the first body 10, the second body 20, and the third body 30, but it is sufficient if the number of these segmented bodies is at least plural, for example, two.

What is claimed is:

1. A lure, comprising:
a first body including a head on a head side and a tail side;
a second body including a tail and connected to the tail side of the first body; and
a connecting portion connecting the second body to the first body such that the second body is swingable relative to the first body over a swing range such that the second body adopts a folded configuration that extends to both left and right sides of the lure toward the head side of the first body, the connecting portion being plate shaped, and
the swing range is capable of exceeding 90 degrees on each of the left and right sides, where 0 degrees is defined as when the position of the second body with respect to the first body is such that a line connecting the head and the tail is located on a straight line, as seen in a top view, and the connecting portion configured to stabilize the lure in the folded configuration.

2. The lure according to claim 1, wherein
the mass of the first body is greater than the mass of the second body.

3. A lure, comprising:
a first body including a head on a head side and a tail side;
a second body including a tail and connected to the tail side of the first body,
a connecting portion connecting the second body to the first body such that the second body is swingable relative to the first body over a first swing range such that the second body adopts a folded configuration that extends toward the head side of the first body, the connecting portion being plate shaped, the connecting portion configured to stabilize the lure in the folded configuration; and
a regulating member configured to regulate the swing range of the second body with respect to the first body to be held in a second swing range, which is narrower than the first swing range.

4. The lure according to claim 3, wherein
the connecting portion includes a magnetic body, and
the regulating member includes a magnet configured to regulate the magnetic body to be held at a center of swing of the second swing range, by a magnetic force acting on the magnetic body.

5. The lure according to claim 3, wherein
the connection portion is a connecting member connected to the first body so as to be swingable,
the first body has a swing support portion supporting the connecting member so as to be swingable over the second swing range, and
the regulating member is disposed on the swing support portion and configured to hold the connecting member at the center of swing of the second swing range.

6. The lure according to claim 5, wherein
the regulating member has a holding portion on the swing support portion and configured to hold the connecting member at the center of swing of the second swing range.

7. The lure according to claim 6, wherein
the holding portion is a recess that corresponds to a shape of the connecting member.

8. The lure according to claim 6, wherein
the regulating member has a guiding portion configured to guide the connecting member to the holding portion.

9. The lure according to claim 8, wherein
the guiding portion includes an inclined surface that is inclined toward the holding portion.

10. The lure according to claim 1, wherein
a third body is connected to a tail side of the second body.

11. The lure according to claim 1, wherein
a hook configured to hook a fish is disposed in the first body, and
the first body or the second body includes a hook engagement portion configured to engage the hook.

12. The lure according to claim 1, wherein
the second body is capable of being folded to both the left and right sides toward the head side when casting.

13. The lure according to claim 9, wherein
the inclined surface of the guiding portion is configured to regulate the first connecting member to be held at the center of swing of the second swing range.

14. The lure according to claim 1, wherein in the folded configuration, the tail of the second body is positioned adjacent the head side of the first body.

15. The lure according to claim 3, wherein in the folded configuration, the tail of the second body is positioned adjacent the head side of the first body.

16. The lure according to claim 1, wherein the connecting portion is configured to enable the tail of the second body to only swing in a plane when adopting the folded configuration.

17. The lure according to claim 3, wherein the connecting portion is configured to enable the tail of the second body to only swing in a plane when adopting the folded configuration.

18. The lure according to claim 1, further comprising a regulating member configured to switch the swing range of the second body with respect to the first body between a first swing range during landing on the water and a second swing range during flight, the first swing range being different from the second swing range.

19. The lure according to claim 3, wherein the regulating member is configured to switch the swing range of the second body with respect to the first body between the first swing range during landing on the water and the second swing range during flight, the second swing range being narrower relative to the first swing range.

20. The lure according to claim 3, wherein the regulating member is configured to return the second body to 0 degrees, where 0 degrees is defined as when the position of the second body with respect to the first body is such that a line connecting the head and the tail is located on a straight line, as seen in a top view.

* * * * *